United States Patent [19]
Bauer et al.

[11] Patent Number: 5,837,358
[45] Date of Patent: Nov. 17, 1998

[54] FILM HAVING ANHYDRIDE FUNCTIONALITY IN OUTER LAYER, PROCESS FOR MAKING SAME, PACKAGING USING SAME, AND PACKAGED PRODUCT COMPRISING SAME

[75] Inventors: Frank T. Bauer, Greenville; Thomas D. Kennedy, Summerville; Ram K. Ramesh, Greer; Paul J. Satterwhite; John S. Sczesny, both of Simpsonville; G. Vincent Sharps, Greer; Richard K. Watson, Simpsonville, all of S.C.

[73] Assignee: W.R. Grace & Co.-Conn., Duncan, S.C.

[21] Appl. No.: 457,892

[22] Filed: Jun. 1, 1995

Related U.S. Application Data

[62] Division of Ser. No. 229,049, Apr. 18, 1994.

[51] Int. Cl.⁶ ..................................................... B32B 7/02
[52] U.S. Cl. ...................... 428/213; 428/423.1; 428/474; 428/475.5; 428/475.8; 428/480; 428/500; 428/532

[58] Field of Search ................................. 428/423.1, 474, 428/475.5, 475.8, 480, 500, 532, 213

[56] References Cited

U.S. PATENT DOCUMENTS 5,053,259  10/1991  Vicik ...................................... 428/36.91
5,077,109  12/1991  Lustig et al. ......................... 428/36.91

*Primary Examiner*—E. Rollins Buffalow
*Attorney, Agent, or Firm*—Rupert B. Hurley, Jr.

[57] ABSTRACT

A packaged product has a cooked meat product, within a film, adhered to a meat-contact surface of the film. An anhydride functionality is present on the meat-contact surface of the film. Upon extraction in ethanol, the anhydride is extractable from the cook-in film to a level of less than 50 parts per billion. A packaged product is prepared by packaging a meat product in the cook-in film and cooking the meat product within the film so that the meat-contact surface of the film adheres to the meat product.

20 Claims, 7 Drawing Sheets

FILM HAVING ANHYDRIDE FUNCTIONALITY IN OUTER LAYER, PROCESS FOR MAKING SAME, PACKAGING USING SAME, AND PACKAGED PRODUCT COMPRISING SAME

This is a Divisional Application of application Ser. No. 229,049, filed Apr. 18, 1994.

FIELD OF THE INVENTION

The present invention relates generally to films, both monolayer films and multilayer films, and particularly to multilayer films suitable for use as packaging films. The present invention is also directed to processes of making films, sealed packages comprising films, and products packaged in films. The present invention is particularly related to films suitable for packaging protein-containing food products in which the film adheres to the food product, and the food product comprises protein on the surface in contact with the packaging film.

BACKGROUND OF THE INVENTION

Multilayer films having one or more layers containing an anhydride functionality are known. For example, the anhydride functionality has been present in an internal film layer for the purpose of enabling a desired level of bonding with an adjacent film layer, i.e., to provide tying function. More particularly, it is known to provide a multilayer film containing a polyamide layer with an adjacent layer comprising an anhydride-containing polymer. The anhydride functionality, on the surface of the anhydride-containing layer, provides a relatively strong bond with the amide functionality on the surface of the polyamide-containing layer. This relatively strong bond enables the anhydride-containing layer to serve as a tie layer which ties the polyamide layer to another layer which ordinarily would not bond sufficiently with the polyamide-containing layer, such as a layer comprising a polyolefin. As such, the anhydride-containing layer serves as a tie layer to indirectly adhere relatively incompatible layers to one another.

Furthermore, ethylene-ethyl acrylate-maleic anhydride copolymer and ethylene-butyl acrylate-maleic anhydride copolymer, are known for use in a meat-contact layer of a multilayer film. The acrylate-maleic anhydride functionality is present in order to provide the outer layer with high meat adhesion during cook-in.

It is also known that the food-contact layer of a multilayer film can comprise any one or more of a wide variety of polymeric compositions, including polyethylenes of various types, polypropylene, polybutene, and copolymers thereof, ionomer resins, ethylene-acrylic acid copolymers, ethylene-vinyl acetate copolymers, and modified polyolefin resins including polymers modified by copolymerizing an olefin homopolymer or copolymer with unsaturated carboxylic acid, e.g., maleic acid, fumaric acid or the like, or a derivative thereof such as anhydride, ester or metal salt.

Ionomers such as metal-neutralized copolymers of an olefin and a carboxylic acid are also known for use in an outer film layer, in order to provide the outer surface of the multilayer film with meat-adhesion properties during cook-in. Furthermore, an outer film layer containing a graft copolymerized unsaturated carboxylic acid is also known in an outer film layer, for improving heat-bonding to an adjacent layer of polymerized ethylene vinyl alcohol, wherein the outer copolymerized carboxylic acid layer is also in contact with meat.

Since ionomer-containing resins are expensive, it would be desirable to locate a less-expensive resin exhibiting good meat-adhesion properties. It would also be desirable to provide a food-contact layer which has adequate meat-adhering properties as well as relatively high heat-seal properties, because such films are used in cook-in applications, in which a meat product is sealed in a package comprising the film having the meat-adhesion layer as the inside layer directly against the meat product, to prevent cook-out (i.e., purge, also known as free moisture) during the cook-in process. It would also be desirable to provide a heat-shrinkable multilayer film having the combination of relatively high heat-shrink, relatively low purge, relatively easy stripping with relatively low meat pull-off during stripping, and relatively high seal strength, all of these characteristics being obtained for a film packaging a product which has undergone cook-in conditions, or the substantial equivalent thereof.

SUMMARY OF THE INVENTION

The present invention utilizes, for a cook-in meat product, a film which has adequate meat-adhesion properties to prevent substantial cook-out, i.e., purge, during cook-in, but, surprisingly, does not adhere so strongly to the meat that substantial meat pull-off occurs during stripping of the package from the cooked meat product. Furthermore, the present invention provides a high seal strength during cook-in applications, to prevent seal failure during cook-in. The anhydride functionality present on the meat-contact surface of the film is suitable for direct food-contact during cook-in, because the anhydride is extractable from the cook-in film to a level of less than 50 parts per billion, as determined via Condition A extraction (described in detail below). Furthermore, the composition comprising an anhydride functionality is inexpensive relative to the cost of polyamides, ionomers, carboxylic acid modified polymers, and ester modified polymers, while still being suitable for direct contact with meat during a cook-in process.

In addition, the film according to the present invention enables the elimination of dust or other antiblocking agents and slip agents, as known to those of skill in the art, and does not require corona treatment in order to achieve an adequate level of meat adhesion for preventing a substantial amount of purge in a cook-in product, and provides an improved level of optical characteristics, such as improved transparency and reduced haze, relative to films requiring the use of antiblock agents and slip agents. The film used in the present invention can also be designed for use in thermoforming operations, i.e., has desirable heat-resistance, good mold-release during forming, and good sealing characteristics.

Optionally, the film used in the present invention can be biaxially oriented, in order to additionally provide relatively high heat-shrink characteristics under cook-in conditions, to produce a product in a tight package, if such is desired.

The present invention is directed to a packaged product comprising a cooked meat product within a film. The cooked meat product is adhered to a meat-contact surface of the film. An anhydride functionality is present on the meat-contact surface of the film. Upon carrying out a Condition A extraction, the anhydride is extractable from the film to a level of less than 50 parts per billion.

The present invention is also directed to a process comprising packaging a meat product in a package by encasing the meat product within a package comprising a film. Thereafter, the packaged meat product is cooked so that the meat-contact surface of the film adheres to the meat product.

The packaging of the meat product comprises encasing the meat product in a film comprising an anhydride functionality on a meat-contact surface thereof, wherein upon carrying out a Condition A extraction, the anhydride is extractable from the film to a level of less than 50 parts per billion.

The present invention also pertains to a multilayer film comprising an outer sealant layer and a core sealant layer, wherein an outer sealant layer has a thickness less than 100% of the thickness of the core sealant layer, and the core sealant layer has a Vicat softening point less than 5° C. higher than the Vicat softening point of the outer sealant layer. The outer sealant layer comprises an anhydride functionality, and upon carrying out a Condition A extraction, the anhydride is extractable from the film to a level of less than 50 parts per billion. Preferably, the outer sealant layer has a thickness of less than 50% of the thickness of the core sealant layer; more preferably, 25%. Preferably, the core sealant layer comprises at least one member selected from the group consisting of polyolefin, polystyrene, polyamide, polyester, polymerized ethylene vinyl alcohol, polyvinylidene chloride, polyether, polyurethane, polycarbonate, and starch-based polymer.

Finally, the present invention relates to a multilayer film comprising an outer heat-resistant layer, a sealing layer, and a core layer between the outer heat-resistant layer and the sealing layer. The outer heat-resistant layer has a Vicat softening point of at least 5° C. greater than the Vicat softening point of the sealing layer. The outer heat-resistant layer also has a Vicat softening point at least 5° C. greater than the Vicat softening point of the core layer. The core layer comprises a blend of amorphous nylon and at least one member selected from the group consisting of polyamide 6, polyamide 11, polyamide 12, polyamide 66, polyamide 610, polyamide 612, polyamide 6/12 copolymer, polyamide 6/66 copolymer, and polyamide 66/610 copolymer. In general, the amorphous nylon is present in the blend in an amount of least 5 weight percent, based on the weight of the blend; preferably, an amount of at least 20 weight percent; more preferably, an amount of from about 20 to 70 weight percent; still more preferably, an amount of about 25 weight percent. Preferably, the core layer comprises polyamide 6. Preferably, the outer layer has a thickness less than 25% of thy total film thickness; more preferably, about 5% the total thickness.

DETAILED DESCRIPTION OF THE INVENTION

Figure 1:
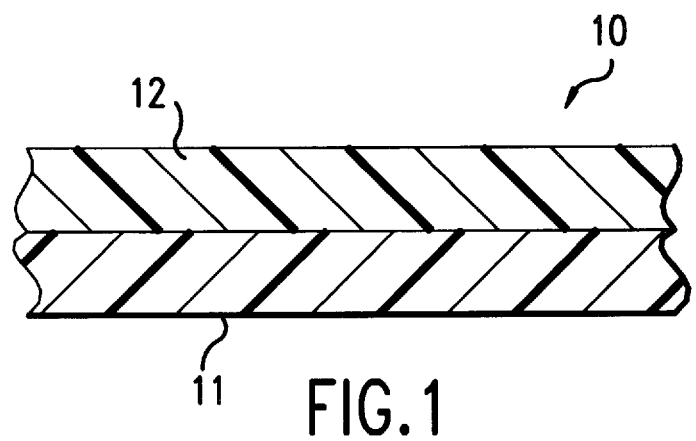
FIGS. 1 illustrates an enlarged cross-sectional view of a two-layer multilayer film in accord with the present invention.

As used herein, the phrase "Condition A extractable" refers to extraction of anhydride functionality from a film layer in direct contact with food, the extraction being carried out according to FDA guidelines as set forth hereinbelow, i.e., using 10 grams of extracting solution (100% water or a mixture of 95% ethanol/5% water), at 250° F. for 2 hours, followed by continuing the extraction at 120° F. for an additional 240 hours, as discussed in greater detail below.

As used herein, the term "sealed" refers to any and all means of closing a package, such as heat sealing via hot air and/or heated bar, ultrasonic sealing, and even the use of clips on, for example, a shirred casing, etc.

As used herein, the phrase "meat-contact layer", refers to a layer of a multilayer film which is in direct contact with the meat-containing product packaged in the film. The meat-contact layer is an outer layer, in order to be in direct contact with the meat product. The meat-contact layer is an inside layer in the sense that in the packaged meat product, the meat-contact layer is the innermost film layer in direct contact with the food.

As used herein, the phrase "meat-contact surface" refers to a surface of a meat-contact layer which is in direct contact with the meat in the package.

As used herein, the phrase "meat pull-off" refers to that portion of a cook-in meat product which is torn off of the meat product upon stripping the cook-in film from the cooked meat product.

As used herein, the phrase "meat-adhesion", and "adhered", refer to maintaining direct contact between the meat surface and the meat-contact surface of the film, so that there is an absence of a substantial amount of free moisture, i.e., purge, which is water and juices emitted outside of the meat product. In general, there is an absence of a substantial amount of free moisture if the level of free moisture is from about 0 to 2%, based on the weight of the meat product before cooking. Preferably the amount of free moisture is from about 0 to 1%, more preferably, 0 to 0.5%, and still preferably from 0 to 0.1 percent based on the weight of the meat product before cooking.

As used herein, the phrase "cook-in" refers to the process of cooking a product packaged in a material capable of withstanding exposure to long and slow cooking conditions while containing the food product, for example submersion in water at 57° C. to 121° C. (i.e, 135° F.–250° F.) for 2–12 hours, preferably 57° C. to 100° C.(i.e, 135° F.–250° F.) for 2–12 hours. Cook-in packaged foods are essentially pre-packaged, pre-cooked foods which may be directly transferred to the consumer in this form. These types of foods may be consumed with or without warming. Cook-in packaging materials maintain seal integrity, and in the case of multilayer films are delamination resistant. Cook-in films must also be heat shrinkable under cook-in conditions so as to form a tightly fitting package. Cook-in films preferably have a tendency for adhesion to the food product, thereby preventing "cook-out", which is the collection of juices between the outer surface of the food product and the meat-contact surface of the film, i.e., the surface in direct contact with the meat. Additional optional characteristics of films for use in cook-in applications include delamination-resistance, low oxygen permeability, heat-shrinkability representing about 20–50% biaxial shrinkage at about 85° C. (185° F.), and optical clarity.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "barrier", and the phrase "barrier layer", as applied to films and/or film layers, is used with reference to the ability of a film or film layer to serve as a barrier to oxygen.

As used herein, the term "lamination", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an α-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

Slurry polymerization processes generally use superatmospheric pressures and temperatures in the range of 40°–100° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization, and relatively inert. Preferably, hexane or toluene is employed.

Alternatively, gas-phase polymerization process utilizes superatmospheric pressure and temperature in the range of about 50°–120° C. Gas phase polymerization can be performed in a stirred or fluidized bed of catalyst and product particles in a pressure vessel adapted to permit the separation of product particles from unreacted gases. Ethylene, comonomer, hydrogen and an inert diluent gas such as nitrogen can be introduced or recirculated so as to maintain the particles at temperatures of 50°–120° C. Triethylaluminum may be added as needed as a scavenger of water, oxygen, and other impurities. Polymer product can be withdrawn continuously or semicontinuously, at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

High pressure polymerization processes utilize a catalyst system comprising a cyclopentadienyl-transition metal compound and an alumoxane compound. It is important, in the high-pressure process, that the polymerization temperature be above about 120° C., but below the decomposition temperature of the polymer product. It is also important that the polymerization pressure be above about 500 bar (kg/cm$^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer copolymerizes in a higher weight or molar percent. However, the first listed monomer preferably is polymerizes in a higher weight percent than the second listed monomer, and, for copolymers which are terpolymers, quadripolymers, etc., preferably, the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/α-olefin copolymer"), identifies the comonomers which are copolymerized to produce the copolymer. Such phrases as "ethylene α-olefin copolymer" is the respective equivalent of "ethylene/α-olefin copolymer."

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

More particularly, homogeneous ethylene/α-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/α-olefin copolymers useful in this invention will have a ($M_w/M_n$) of less than 2.7. Preferably, the ($M_w/M_n$) will have a range of about 1.9 to 2.5. More preferably, the ($M_w/M_n$) will have a range of about 1.9 to 2.3. The composition distribution breadth index (CDBI) of such homogeneous ethylene/α-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/α-olefin copolymers have a CDBI greater than about 70%, i.e., a CDBI of from about 70% to 99%. In general, the homogeneous ethylene/α-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/α-olefin copolymers exhibit an essentially singular melting point characteristic, with a peak melting point ($T_m$), as determined by Differential Scanning Colorimetry (DSC), of from about 60° C. to 110° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/α-olefin copolymer can, in general, be prepared by the copolymerization of ethylene and any one or more α-olefin. Preferably, the α-olefin is a $C_3$–$C_{20}$ α-monoolefin, more preferably, a $C_4$–$C_{12}$ α-monoolefin, still more preferably, a $C_4$–$C_8$ α-monoolefin. Still more preferably, the α-olefin comprises at least one member selected from the group consisting of butene-1, hexene-1, and octene-1, i.e., 1-butene, 1-hexene, and 1-octene, respectively. Most preferably, the α-olefin comprises octene-1, and/or a blend of hexene-1 and butene-1.

Processes for preparing homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of one genus of homogeneous ethylene/α-olefin copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another genus of homogeneous ethylene/α-olefin copolymers is disclosed in U.S. Pat. No. 5,272,236, to LAI, et. al., and U.S. Pat. No. 5,278,272, to LAI, et. al., both of which are hereby incorporated in their entireties, by reference thereto.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers they catalyze the polymerization of.

As used herein, the term "polyolefin" refers to any polymerized olefin, which can be linear, branched, cyclic, aliphatic, aromatic, substituted, or unsubstituted. More specifically, included in the term polyolefin are homopolymers of olefins, copolymers of olefins, copolymers of an olefin and an non-olefinic comonomer copolymerizable with the olefin, such as vinyl monomers, modified polymers thereof, and the like. Specific examples include polypropylene homopolymers, polyethylene homopolymers, polybutene, propylene/α-olefin copolymers, ethylene/α-olefin copolymers, butene/α-olefin copolymers, ethylene/vinyl acetate copolymers, ethylene/ethyl acrylate copolymers, ethylene/butyl acrylate copolymers, ethylene/methyl acrylate copolymers, ethylene/acrylic acid copolymers, ethylene/methacrylic acid copolymers, modified polyolefin resins, ionomer resins, polymethylpentene, etc. The modified polyolefin resins include modified polymers prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/α-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT (TM) materials supplied by Exxon, and TAFMER (TM) materials supplied by Mitsui Petrochemical Corporation. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/α-olefin copolymers, such as the long chain branched homogeneous ethylene/α-olefin copolymers available from the Dow Chemical Company, known as AFFINITY (TM) resins, are also included as another type of ethylene alphα-olefin copolymer useful in the present invention.

In general, the ethylene/α-olefin copolymer comprises a copolymer resulting from the copolymerization of from about 80 to 99 weight percent ethylene and from 1 to 20 weight percent α-olefin. Preferably, the ethylene α-olefin copolymer comprises a copolymer resulting from the copolymerization of from about 85 to 95 weight percent ethylene and from 5 to 15 weight percent α-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of a multilayer film having only one of its principal surfaces directly adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "sealant layer", with respect to multilayer films, refers to an outer film layer, or layers, involved in the sealing of the film to itself or another layer. It should also be recognized that in general, the outer 0.5 to 3 mils of a film can be involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a food contact layer in the packaging of foods.

As used herein, the phrase "tie layer" refers to any internal layer having the primary purpose of adhering two layers to one another.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

Although the majority of the above definitions are substantially as understood by those of skill in the art, one or more of the above definitions may be defined hereinabove in a manner differing from the meaning as ordinarily understood by those of skill in the art, due to the particular description herein of the present invention.

In general, the film used in the present invention can be a monolayer film or a multilayer film. The multilayer film illustrated in FIG. 1 comprises two layers; in FIG. 2, six layers; in FIG. 3, eight layers; in FIG. 5, seven layers; and in FIG. 6, nine layers. Preferably, the film used in the present invention comprises from 2 to 20 layers; more preferably, from 2 to 12 layers; and still more preferably, from 4 to 9 layers.

In general, the multilayer film used in the present invention can have any total thickness desired, so long as the film provides the desired properties for the particular packaging operation in which the film is used. Preferably, the film used in the present invention has a total thickness (i.e., a combined thickness of all layers), of from about 0.5 to 10 mils (1 mil equals 0.001 inch); more preferably, from about 3 to 8 mils; and still more preferably, from 4 to 8 mils.

In FIG. 1, multilayer film 10 comprises first layer 11 and second layer 12. First layer 11 serves as a meat-contact layer and a sealing layer, i.e., comprises an anhydride functionality and, as known to those of skill in the art, further comprises a polymer suitable for forming a seal via the application of heat or radiation. Second layer 12 serves as an abuse layer.

Figure 2:
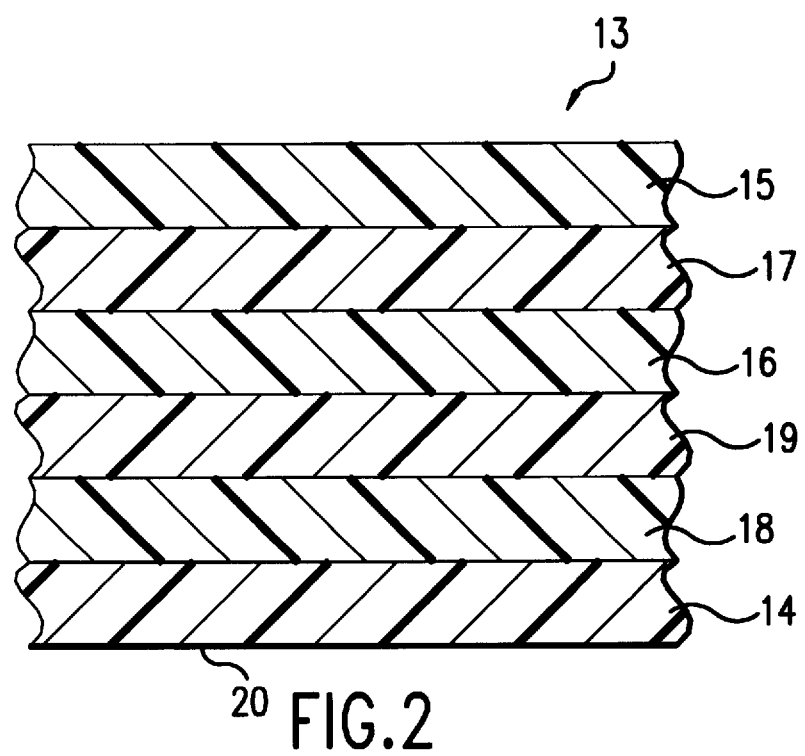
FIG. 2 illustrates an enlarged cross-sectional view of a six-layer multilayer film in accord with the present invention.
Figure 3:
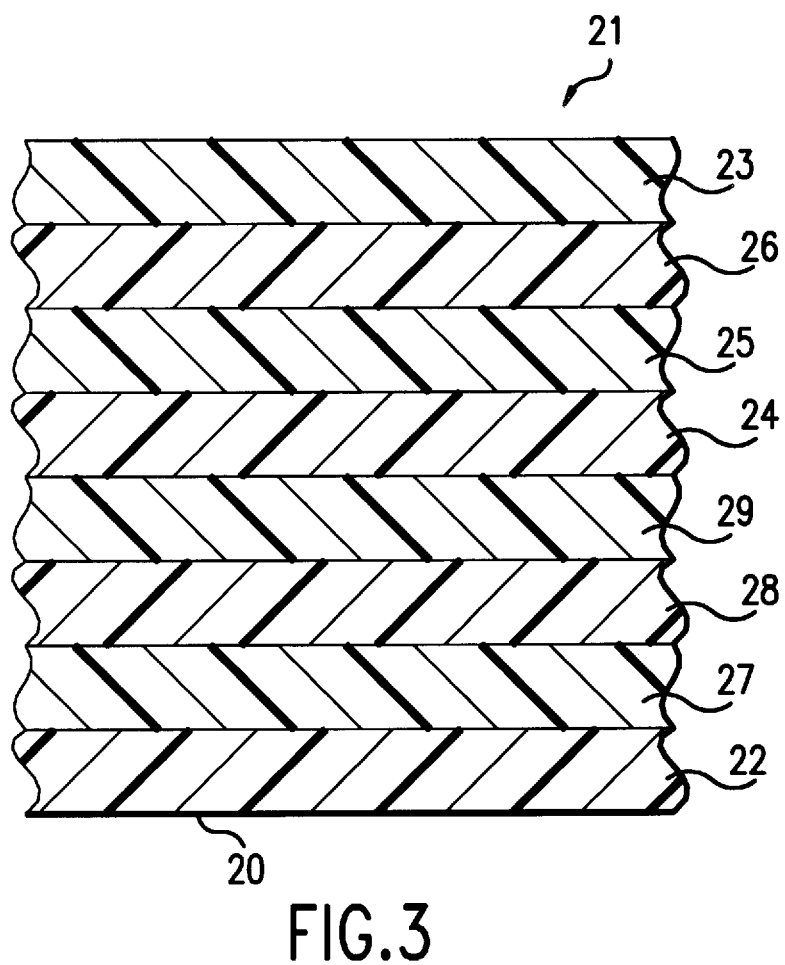
FIG. 3 illustrates an enlarged cross-sectional view of a eight-layer multilayer film in accord with the present invention.

FIGS. 2 and 3 illustrate two alternative preferred embodiments of oriented, heat-shrinkable multilayer films to be used in accordance with the present invention. FIG. 2 illustrates a six-layer film, and FIG. 3 illustrates an eight-layer film. These two films are especially suited for conversion to heat-shrinkable bags for the packaging of meat products, in accordance with the present invention.

FIG. 2 illustrates a preferred embodiment of a heat-shrinkable multilayer film 13 to be used in packaging meat in bags, casings, and films, in accordance with the present invention. First layer 14 serves as an inside layer and has outer meat-contact surface 20 for direct contact with the meat being packaged. First layer 14 contains an anhydride functionality, which is also present on meat-contact surface 20, for preventing purge during cook-in. Preferably, first layer 14 is made from PLEXAR (TM) 360 anhydride-containing linear low density polyethylene, a product obtained from Quantum Chemical Corporation, USI Division, 11500 Northlake Drive, Cincinnati, Ohio, 45249. PLEXAR (TM) 360 anhydride-containing linear low density polyethylene, is a linear low density polyethylene containing an anhydride functionality which is extractable under conditions of high temperature, heat sterilization, or retort, at over 212° F., in 100% water or a mixture of 95% ethanol 5% water, to a level of less than 50 parts per billion, using a procedure in accordance with "Recommendations for Chemistry Data for Indirect Food Additive Petitions", September, 1988, as issued by the Division of Food Chemistry & Technology, Center for Food Safety & Applied Nutrition, Food & Drug Administration, Department of Health & Human Services, Washington, D.C. 20204, which is hereby incorporated in its entirety, by reference thereto. The analysis of the level of extractables from the anhydride-containing meat-contact layer is carried out according to procedures for analysis of fatty foods (all meats are considered to be fatty foods), more particularly, according to an extraction protocol in Appendix II in "Recommendations for Chemistry Data for Indirect Food Additive Petitions", cited above. This extraction protocol calls for heating the package, containing the extracting solution, at 250° F. for two hours, followed by continuing the extraction at 120° F. for an additional 240 hours, with extracts being analyzed at the end of the initial two hour period, and after 24, 96, and 240 hours. The extracting solution is present at a level of 10 grams of solution per square inch of film. An anhydride level of less than 50 parts per billion in the extracts is considered, by the FDA, to be so low as not to be considered as a food additive. As such, PLEXAR (TM) 360 anhydride-containing linear low density polyethylene is considered to be suitable for direct contact with food, even during cook-in conditions such as cooking the meat at a temperature of from about 135° F. to 212° F., for a period of from about 2 to 12 hours. Other Plexar (TM) products, such as Plexar (TM) 340 anhydride-containing linear low density polyethylene, are also suitable for direct food contact under cook-in conditions.

In general, first layer 14 can have a thickness of from about 0.1 to 3 mils; preferably, from 0.2 to 1 mil; more preferably, from 0.3 to 0.8 mil; and still more preferably, about 0.5 mil. In general, first layer 14 comprises an anhydride functionality which can be merely blended in with the polymer, and/or reacted onto the polymer, and/or copolymerized (graft, random, etc.) in the polymer. The anhydride functionality can also be reacted onto a second polymer, which is thereafter blended with an unmodified linear low density polyethylene which makes up the majority of the first layer. In general, first layer 14 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; preferably, at least one member selected from the group consisting of polyolefin; more preferably, at least one member selected from the group consisting of ethylene α-olefin copolymer, propylene α-olefin copolymer, butene α-olefin copolymer, ethylene vinyl acetate copolymer, ethylene acrylate copolymer, and ethylene acrylic acid copolymer; still more preferably, linear low density polyethylene.

Second layer 15 serves as an outside heat-resistant and abuse layer, and, in general, has a thickness of from about 0.1 to 3 mils; preferably, from 0.2 to 1 mil; more preferably, from 0.3 to 0.8 mil; and still more preferably, about 0.35 to 0.65 mil. In general, second layer 15 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; preferably, at least one member selected from the group consisting of polyolefin; more preferably, at least one member selected from the group consisting of ethylene α-olefin copolymer, propylene α-olefin copolymer, butene α-olefin copolymer, ethylene vinyl acetate copolymer, ethylene acrylate copolymer, ethylene acrylic acid copolymer; still more preferably, at least one member selected from the group consisting of a blend of 90 weight percent ethylene vinyl acetate copolymer (having 6.5 weight percent vinyl acetate) with 10 weight percent high density polyethylene.

Third layer 16 is an internal layer between first layer 14 and second layer 15, and preferably comprises a polymer having relatively high oxygen barrier characteristics. In general, third layer 16 can have a thickness of from about 0.05 to 2 mils; preferably, from 0.05 to 0.5 mil; more preferably, from 0.1 to 0.3 mil; and still more preferably, from about 0.12 to 0.17 mils. In general, third layer 16 comprises at least one member selected from the group consisting of polymerized ethylene vinyl alcohol (EVOH), polyvinylidene chloride, polyamide, and polyester; preferably, at least one member selected from the group consisting of polymerized ethylene vinyl alcohol and polyamide; more preferably, polymerized ethylene vinyl alcohol; still more preferably, polymerized ethylene vinyl alcohol having about 44 mole percent ethylene.

Fourth layer 17 is a tie layer between second layer 15 and third layer 16. As a general rule, tie layers should have a relatively high degree of compatibility with barrier layers, such as polymerized EVOH, as well as non-barrier layers, such as polymerized ethylene α-olefin copolymers, and, in general, the composition, number, and thickness of the tie layer is as known to those of skill in the art. More specifically, fourth layer 17 has a thickness of from about 0.01 to 0.5 mil; preferably, from 0.05 to 0.3 mil; and more preferably, from about 0.1 to 0.25 mils. In general, fourth layer 17 comprises at least one member selected from the group consisting of modified polyolefin, ionomer, ethylene acrylate copolymer, ethylene acrylic acid, polyamide, and polyurethane; preferably, at least one member selected from the group consisting of modified polyolefin and polyurethane; more preferably, anhydride modified polyolefin; still more preferably, anhydride-grafted linear low density polyethylene.

Fifth layer 18, a core layer between the first layer and the third layer, provides the multilayer film with desired abuse, shrink, and optical characteristics, and preferably comprises a polymer having relatively low cost while providing these attributes. In general, fifth layer 18 can have a thickness of from about 0.1 to 3 mils; preferably, from 0.2 to 1.5 mil; more preferably, from 0.3 to 1 mil; and still more preferably, from about 0.50 to 0.80 mils. In general, fifth layer 17 comprises at least one member selected from the group consisting of polyolefin, polyamide, polyester, and polyurethane; preferably, at least one member selected from the group consisting of polyolefin and polyamide; more preferably, at least one member selected from the group consisting of ethylene vinyl acetate, ethylene α-olefin copolymer, propylene α-olefin copolymer, ethylene acrylate copolymer, polyethylene homopolymer, and polypropylene homopolymer; still more preferably, a blend of 80 weight percent ethylene vinyl acetate copolymer (having 9 weight percent vinyl acetate) with 20 weight percent linear low density polyethylene.

Sixth layer 19 is a tie layer between the third layer and the fifth layer. Sixth layer 19 has the same general and preferred thicknesses and chemical compositions as fourth layer 17.

FIG. 3 illustrates an alternative preferred embodiment of a heat-shrinkable multilayer film 21 to be used in packaging meat in bags, casings, and films, in accordance with the present invention. Multilayer film 21 comprises first layer 22, second layer 23, third layer 24, fourth layer 25, fifth layer 26, sixth layer 27, seventh layer 28, and eighth layer 29.

First layer 22 is a meat-contact and heat seal layer which, in general, is analogous to first layer 14 of FIG. 2, and serves as an inside layer and has outer meat-contact surface 20 for direct contact with the meat being packaged. In general, first layer 22 has a thickness and chemical composition analogous to first layer 14 of FIG. 2. However, most preferably first layer 22 has a thickness of about 0.37 mil.

Second layer 23 is an outer abuse-resistant layer which, in general, is analogous to second layer 14 of FIG. 2. In general, second layer 23 has a thickness and chemical composition analogous to second layer 14 of FIG. 2. However, second layer 23 is most preferably 100% linear low density polyethylene, and most preferably has a thickness of about 0.36 mil.

Third layer 24 is a core layer between first layer 22 and second layer 23, and in general is analogous to third layer 16 of FIG. 2. In general, third layer 24 has a thickness and chemical composition analogous to third layer 16 of FIG. 2. However, third layer 24 most preferably has a thickness of about 0.13 mil.

Fourth layer 25 is a tie layer between second layer 23 and third layer 24, and in general is analogous to fourth layer 17 of FIG. 2. In general, fourth layer 25 has a thickness and chemical composition analogous to fourth layer 17 of FIG. 2. However, fourth layer 25 most preferably has a thickness of about 0.22 mil.

Fifth layer 26 is a core layer between second layer 23 and fourth layer 25, and provides abuse-resistance, improved heat shrink properties, and improved optical properties to multilayer film 21. In general, fifth layer 26 has a thickness and chemical composition analogous to fifth layer 18 of FIG. 2. However, fifth layer 26 most preferably has a thickness of about 0.37 mil.

Sixth layer 27 is a core layer between first layer 22 and third layer 24, and provides abuse-resistance, improved heat shrink properties, and improved optical properties, to multilayer film 21. In general, sixth layer 27 has a thickness and chemical composition analogous to fifth layer 26. However, sixth layer 27 most preferably has a thickness of about 0.54 mil.

Seventh layer 28 is a tie layer between sixth layer 27 and third layer 24, and, in general, is analogous to fourth layer 25. In general, seventh layer 28 has a thickness and chemical composition analogous to fourth layer 25. However, seventh layer 28 most preferably has a thickness of about 0.12 mil.

Eighth layer 29 is a core layer between seventh layer 28 and third layer 24, and provides improved abuse-resistance and elastic recovery to multilayer film 21, and preferably comprises a polymer having relatively high modulus and/or relatively high elastic recovery, such as a polyamide and/or a thermoplastic elastomer. In general, eighth layer 29 can have a thickness of from about 0.05 to 1 mil; preferably, from 0.1 to 0.5 mil; more preferably, from about 0.2 to 0.4 mil, and still more preferably, about 0.23 mils. Preferably, eighth layer 29 comprises a polyamide; more preferably, at least one member selected from the group consisting of polyamide 6, polyamide 11, polyamide 12, polyamide 66, polyamide 610, and polyamide 612, and copolymers of any combination of these polyamides or any additional polyamides known to those of skill in the art; still more preferably, a blend of 50 weight percent copolyamide 66/610 and 50 weight percent copolyamide 6/12.

The films according to the present invention are suited to many different forms of packaging applications, such as shirred casings, heat shrinkable bags, films (both heat-shrinkable as well as non-heat-shrinkable), and web and lid stock suitable for thermoforming. However, the films illustrated in FIG. 2 and FIG. 3 are especially suited for use in heat-shrinkable bags. Thus, multilayer film 13 and multilayer film 21 preferably have a machine direction free shrink of at least 10 percent at a temperature of 185° F. for 8 seconds, and a transverse direction free shrink of at least about 10 percent at a temperature of 185° F. for 8 seconds. Furthermore, multilayer film 13 and multilayer film 21 preferably have corona treatment on the meat-contact surface of the inside layer, and, optionally, have corona treatment on the outside surface of the outside layer. Corona treatment of the inside layer can decrease purge, and on the outside layer can improve bonding of the outside layer to another layer, such as the meat-contact surface of the inside layer, in a lap joint.

Figure 4:
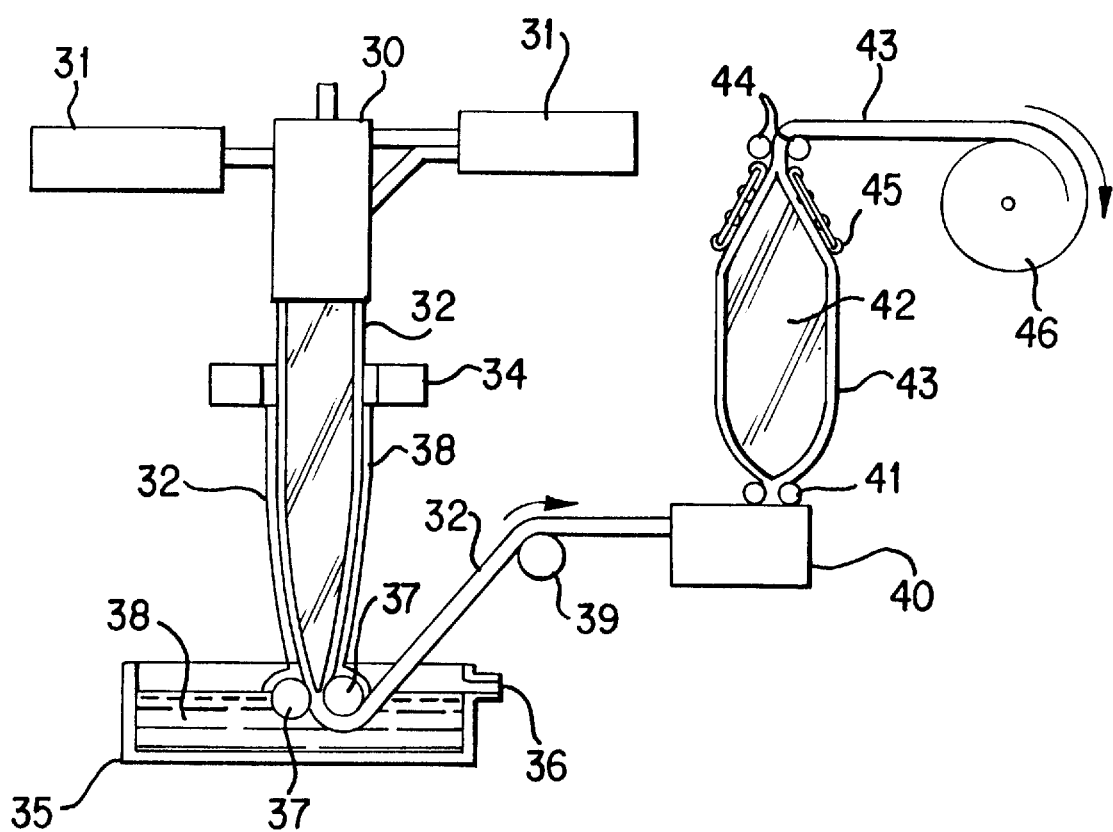
FIG. 4 illustrates a schematic view of a preferred process for making preferred multilayer films as illustrated in FIGS. 2 and 3.

The films of FIGS. 2 and 3 are preferably prepared in accordance with a process as schematically illustrated in FIG. 4, in which the various polymeric formulations are supplied to circular die 30 from a plurality of extruders 31, only two of which are illustrated in FIG. 4. The number of extruders 31 is at least as great as the number of different chemical compositions present in the various layers of the multilayer film, but can be fewer than the number of layers of the film in the event that a stream from an extruder is split to form two different film layers.

The various layers of the film are joined within circular die 30, resulting in the formation of tube 32, which is a substantially unoriented tape comprising all of the layers ultimately present in the film used in accordance with the present invention. The meat-contact layer, i.e., the first layer, is the inside layer of tube 32, and the abuse layer, i.e., the second layer, is the outside layer of tube 32. The barrier layer, the various core layers, and the various tie layers, are positioned between the first and second layers, in the order illustrated in cross-sectional diagrams provided in FIGS. 2 and 3.

Circular die 30 is heated in conventional fashion by means not shown. As tube 32 emerges from the face of die 30, corn starch (not illustrated) is sprayed inside tube 32, in order to prevent blocking of tube 32, as known to those of skill in the art. As tube 32 leaves the face of die 30, tube 32 is drawn in a downward direction, past water-cooling ring 34, having water 38 flowing downwardly therefrom, over the exterior surface of tube 32, and cascading downward into tank 35. Overflow 36 maintains the level of water 38 in tank 35. Tube 32 is drawn downwardly and between driven pinch rolls 37.

After passing over guide roll 39, tube 32 is passed through a scan beam of an electronic crosslinking unit (not illustrated), as known to those of skill in the art. Tube 32, emerging from the electronic crosslinking unit, is then fed to hot oven 40. At the outlet of oven 40 are pinch rolls 41, which forward the tube 32, now heated, immediately into an orientation zone, in which the emerging heated tube is simultaneously stretched and drawn, resulting in the formation of a bubble of oriented multilayer film 43, as used in the present invention. The hot tube, upon emerging from oven 40, is stretched in the transverse direction via inflation with air 42 (introduced into the tube to form a bubble between pinch rolls 41 and pinch rolls 44), and drawn in the machine direction by pinch rolls 44, which forward the resulting oriented multilayer film 43 at a higher speed than the speed at which tube 32 is forwarded by pinch rolls 41. Multilayer film 43 is cooled by external air while in the bubble configuration. The bubble of oriented multilayer film 43 is gradually flattened with the aid of converging rolls 45. Following the collapse of the bubble of multilayer film 43 by converging rolls 45, the resulting flattened multilayer film is fed to windup roll 46, which is rotated by a motor (not illustrated).

The resulting multilayer film can be used to form bags, casings, etc., which, in turn, can be used for the packaging of meat products, in accordance with the present invention. Examples 1 and 2, below, provide additional details on the film, its use in the packaging of a meat product, and the unexpected results obtained from the use of the film in the packaging and cook-in of the meat product, i.e., the low level of purge in combination with the low level of meat pull-off after the cook-in process is complete.

Figure 5:
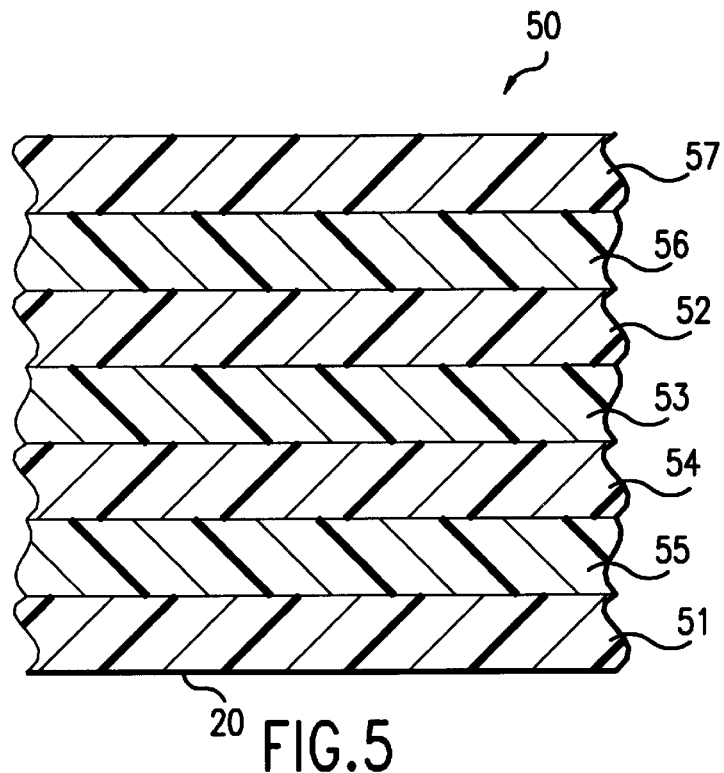
FIG. 5 illustrates an enlarged cross-sectional view of a seven-layer multilayer film in accord with the present invention.
Figure 6:
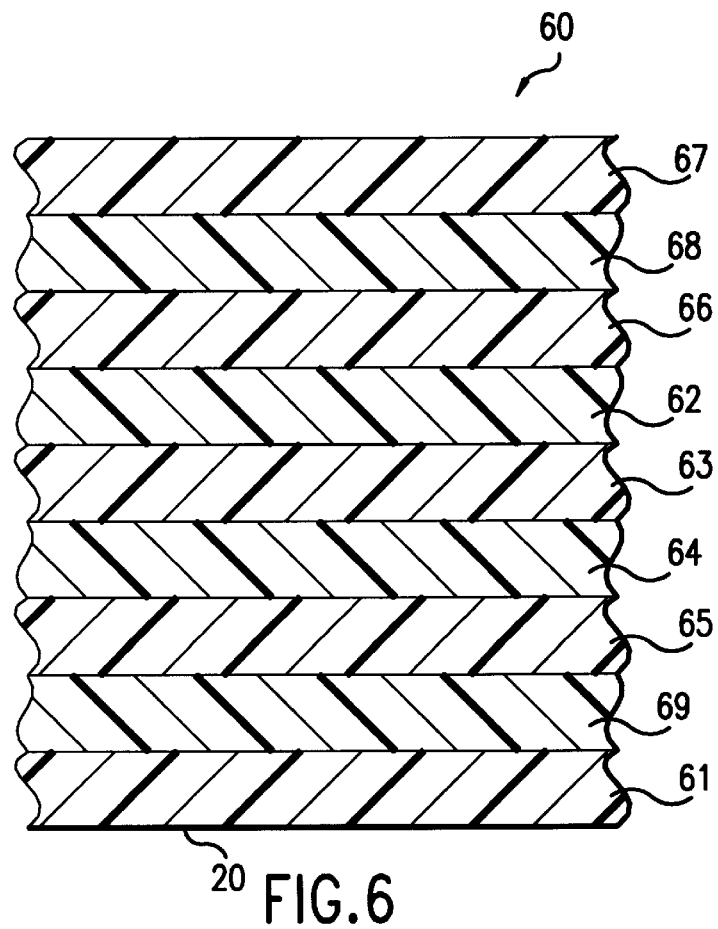
FIG. 6 illustrates an enlarged cross-sectional view of a nine-layer multilayer film in accord with the present invention.

FIGS. 5 and 6 illustrate two preferred embodiments of multilayer laminate films to be used in accordance with the present invention, FIG. 5 illustrating a seven-layer film, and FIG. 6 illustrating a nine-layer film. These two films are especially suited for use in thermoforming operations, both as the forming web, i.e., a web to be thermoformed, as well as for use as the lidstock. Preferably, the lidstock is a multilayer film comprising the same number of layers and relative layer percentages (thicknesses), differing only in that it has a total thickness of about 50% the total thickness of the forming web.

Seven-layer film 50 illustrated in FIG. 5 comprises first layer 51, which serves as an inside layer and has outer meat-contact surface 20 for direct contact with the meat (not illustrated) being packaged. In general, first layer 51 is analogous to first layer 14 illustrated in FIG. 2, in that first layer 51 functions to prevent purge during cook-in while providing a low level of meat pull-off upon stripping the package from the cooked meat product. As with first layer 14 of FIG. 2, first layer 51 most preferably comprises PLEXAR (TM) 360 linear low density polyethylene having anhydride functionality therein, as described in detail above.

In general, first layer 51 can have a thickness of from about 0.02 to 3 mils. If first layer 51 constitutes the entire sealing layer, preferably it has a thickness of from about 1.2 to 2.6 mils; more preferably, about 2.3 mils. If first layer 51 functions as a mere coating on a sealing layer therebelow, preferably first layer 51 has a thickness of from about 0.1 to 0.8 mil; more preferably, about 0.3 mil. In general, first layer 51 comprises an anhydride functionality which can be merely blended in with the polymer, and/or reacted onto the polymer, and/or copolymerized (graft, random, etc.) in the polymer. The anhydride functionality can also be reacted onto a second polymer, which is thereafter blended with an unmodified polymer, such as polyethylene, which makes up the majority of the first layer. In general, first layer 51 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; preferably, at least one member selected from the group consisting of polyolefin; more preferably, at least one member selected from the group consisting of ethylene α-olefin copolymer, propylene α-olefin copolymer, ethylene vinyl acetate copolymer, ethylene acrylate copolymer, and ethylene acrylic acid copolymer; still more preferably, linear low density polyethylene.

Second layer 52 provides improved abuse-resistance, improved thermoformability, and heat-resistance relative to first layer 51. However, second layer 52 is preferably a core layer. In general, second layer 52 can have a thickness of from about 0.2 to 10 mils; preferably, from 0.3 to 8 mils; and, more preferably, about 0.6 mil. In general, second layer 52 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; preferably, at least one member selected from the group consisting of polyamide, polyester, and polyolefin; more preferably, polyamide; still more preferably, polyamide 6.

Third layer 53 is a core layer between first layer 51 and second layer 52, which optionally can serve as an oxygen barrier layer. In general, third layer 53 can have a thickness of from about 0.1 to 5 mils; preferably, from 0.3 to 1.5 mils; more preferably, about 0.8 mil. In general, third layer 53 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; preferably, at least one member selected from the group consisting of polymerized ethylene vinyl alcohol, polyvinylidene chloride, grafted polyolefin, ethylene α-olefin copolymer, and grafted ethylene vinyl acetate copolymer; more preferably, at least one member selected from the group consisting of ethylene vinyl alcohol copolymer and ethylene α-copolymer; still more preferably, ethylene vinyl alcohol copolymer.

Fourth layer 54 is a core layer between first layer 51 and third layer 53, and provides multilayer film 50 with desired abuse and thermoforming characteristics. In general, fourth layer 54 has a thickness of from about 0.1 to 8 mils; preferably, from 0.2 to 4 mils; more preferably, from 0.4 to 0.7 mil; and still more preferably, about 0.6 mils. In general, fourth layer 54 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; preferably, at least one member selected from the group consisting of polyamide, polyester, and polyolefin; more preferably, polyamide 6.

Fifth layer 55 is a tie layer between first layer 51 and fourth layer 54. In general, fifth layer 55 has a thickness of from about 0.05 to 9 mils; preferably, from 0.2 to 2 mils; more preferably, about 0.65 mil. In general, fifth layer 55 comprises at least one member selected from the group consisting of modified polyolefin, modified polystyrene, modified polyamide, modified polyester, modified polymerized ethylene vinyl alcohol, modified polyvinylidene chloride, modified polyether, modified polyurethane, modified polycarbonate, and modified starch-containing polymer; preferably, at least one member selected from the group consisting of modified polyolefin; more preferably, at least one member selected from the group consisting of anhydride-grafted polyolefin; more preferably, at least one member selected from the group consisting of elastomer modified polyolefin and anhydride-grafted linear low density polyethylene.

Sixth layer 56 and seventh layer 57 are generally used as a pair of layers, rather than individually. Sixth layer 56 is a tie and bulk layer between second layer 52 and seventh layer 57. The chemical composition of sixth layer 56 is preferably identical to the chemical composition of fifth layer 55, described above. However, sixth layer 56 most preferably has a thickness of about 1.85 mils.

Seventh layer 57 is an abuse, thermoforming, and heat-resistant outer layer bonded directly to sixth layer 56. In general, the chemical composition and thickness of seventh layer 57 is analogous to that of second layer 52, described above. However, most preferably seventh layer 57 has a thickness of about 1.2 mils.

FIG. 6 illustrates an alternative preferred embodiment of a multilayer film 60 especially suited to thermoforming operations, for use in the packaged product in accordance with the present invention. In general, the first layer 61, second layer 62, fourth layer 64, fifth layer 65, sixth layer 66, and seventh layer 67, of multilayer film 60, are analogous to the corresponding layers of multilayer film 50 of FIG. 5, i.e., with respect to relative placement, thickness, and chemical composition.

However, even though multilayer film 60 has third layer 63 in the same relative position as third layer 53 of FIG. 5, i.e., positioned between first layer 61 and second layer 62, preferably the chemical composition and thickness of third layer 63 is different from third layer 53 of FIG. 5, i.e., preferably third layer 63 does not comprise EVOH. In general, third layer 63 comprises at least one member selected from the group consisting of modified polyolefin, modified polystyrene, modified polyamide, modified polyester, modified polymerized ethylene vinyl alcohol, modified polyvinylidene chloride, modified polyether, modified polyurethane, modified polycarbonate, and modified starch-containing polymer; preferably, at least one member selected from the group consisting of polyolefin; more preferably, at least one member selected from the group consisting of anhydride-grafted polyolefin; more preferably, at least one member selected from the group consisting of elastomer modified polyolefin and anhydride-grafted linear low density polyethylene. In general, third layer 63 has a thickness of from about 0.05 to 9 mils; preferably, from 0.2 to 2 mils; more preferably, about 0.9 mil.

Eighth layer 68 is a core layer between sixth layer 66 and seventh layer 67, and provides the multilayer film with increased abuse-resistance and increased thermoformability. In general, eighth layer 68 has a thickness of from about 0.2 to 10 mils; preferably, from 0.3 to 8 mils; more preferably, from about 0.3 to 1.2 mils, and, still more preferably, about 0.6 mil. In general, second layer 52 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; preferably, at least one member selected from the group consisting of polyamide, polyester, and polyolefin; more preferably, a polyamide; still more preferably, a blend of 75 weight percent polyamide 6 with 25 weight percent amorphous nylon.

Ninth layer 69 is a core layer between first layer 61 and fifth layer 65, and provides the multilayer film with increased abuse-resistance, bulk, and since outer first layer 61 is preferably thin, also functions, with first layer 61, as a sealant layer. In general, ninth layer 69 can have a thickness of from about 0.1 to 5 mils; preferably, 0.5 to 4 mils; more preferably, 1 to 3 mils; still more preferably, about 2 mils. In general, ninth layer 69 comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer; preferably, at least one member selected from the group consisting of polyolefin; more preferably, at least one member selected from the group consisting of ethylene α-olefin copolymer, propylene α-olefin copolymer, ethylene vinyl acetate copolymer, ethylene acrylate copolymer, and ethylene acrylic acid copolymer; still more preferably, linear low density polyethylene.

Figure 7:
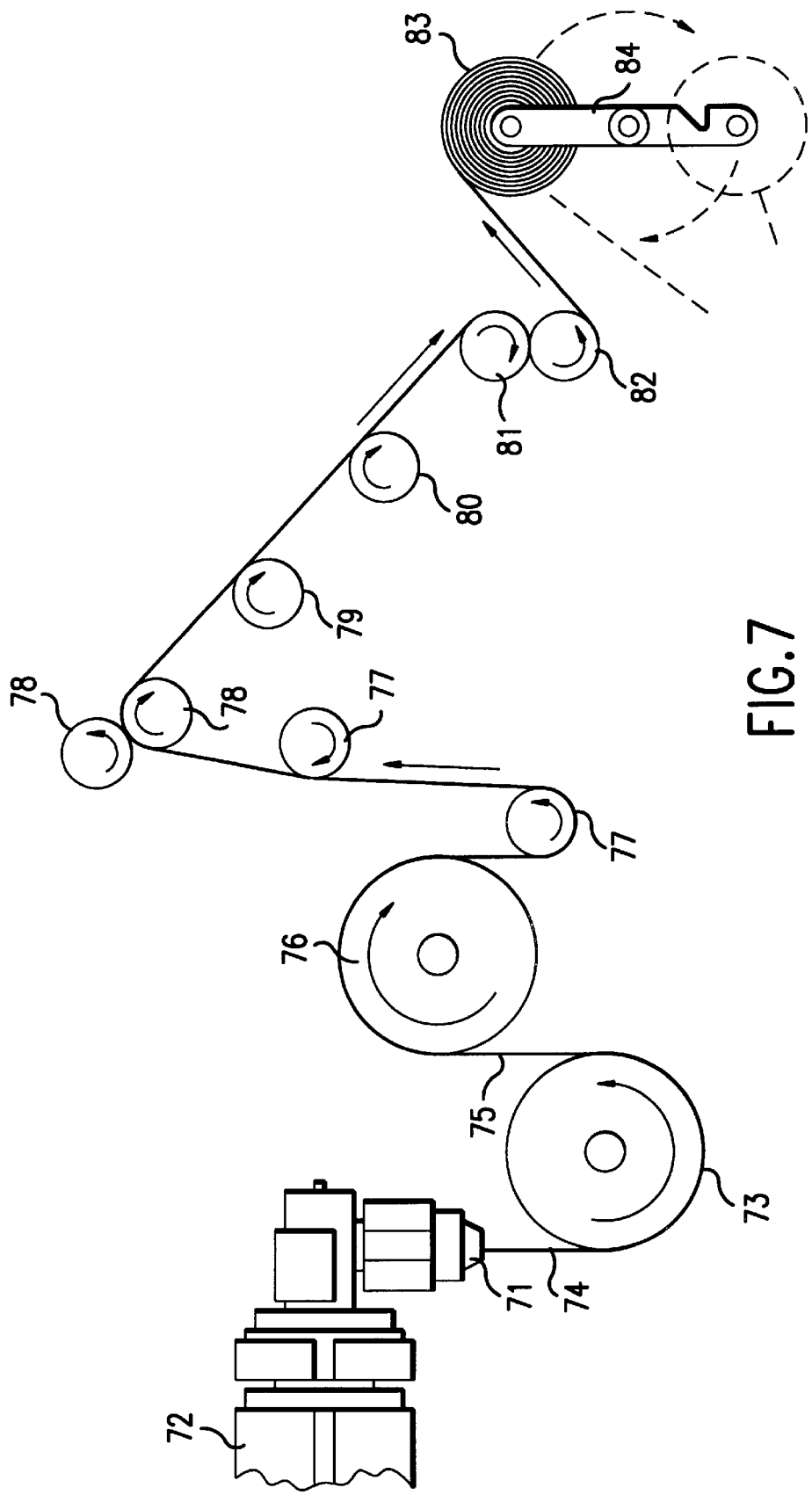
FIG. 7 illustrates a schematic view of a preferred process for making preferred multilayer films as illustrated in FIGS. 4 and 5.

The films of FIGS. 5 and 6 can be prepared in accordance with a cast coextrusion process as schematically illustrated in FIG. 7, in which the various polymeric formulations are supplied to slot-shaped die 71 from a plurality (preferably, from 3 to 10) of extruders 72, only one of which is illustrated in FIG. 7. The number of extruders 72 is at least as great as the number of different chemical compositions present in the various layers of the multilayer film, but can be fewer than the number of layers of the film in the event that a stream from an extruder is split to form two different film layers. Typically, the extruders are single screw extruders which convert polymer granules or pellets into a continuous uniform melt under elevated temperatures and pressure. The molten masses formed within the various extruders are converged into a plurality of layers in a stream which is forced into flat laminar flow for the width of the slot of die 71, and thereafter forced through the slot of die 71, to yield the desired shape. After passing through the slot of die 71, melt 74 passes downward vertically and tangentially contacts chill roll 73 which quenches melt 74, forming multilayer film 75 thereon. Chill roll 73 is highly polished and water-cooled, and rotates with melt 74 at the speed at which melt 74, and film 75, are drawn forward. Film 75 then leaves the surface of chill roll 73, and thereafter may contact the surface of from one to three supplemental chill rolls 76 (only one supplemental chill roll 76 is illustrated in FIG. 7), which are also water-cooled and highly polished, and which further cool multilayer film 75, which thereafter passes over guide rolls 77 and through the nip of nip rolls 78. Film 75 is thereafter directed over guide rolls 79 and 80. Thereafter, film 75 passes between a nip between rubber nip roll 81 and stainless steel nip roll 82, and is then wound up into roll 83 by winder 84. The width of the cast film web is determined by the die slot width. The thickness of film 75 is determined by the relationship between the output of extruder 72 and the takeaway speed of the film 75.

Figure 8:
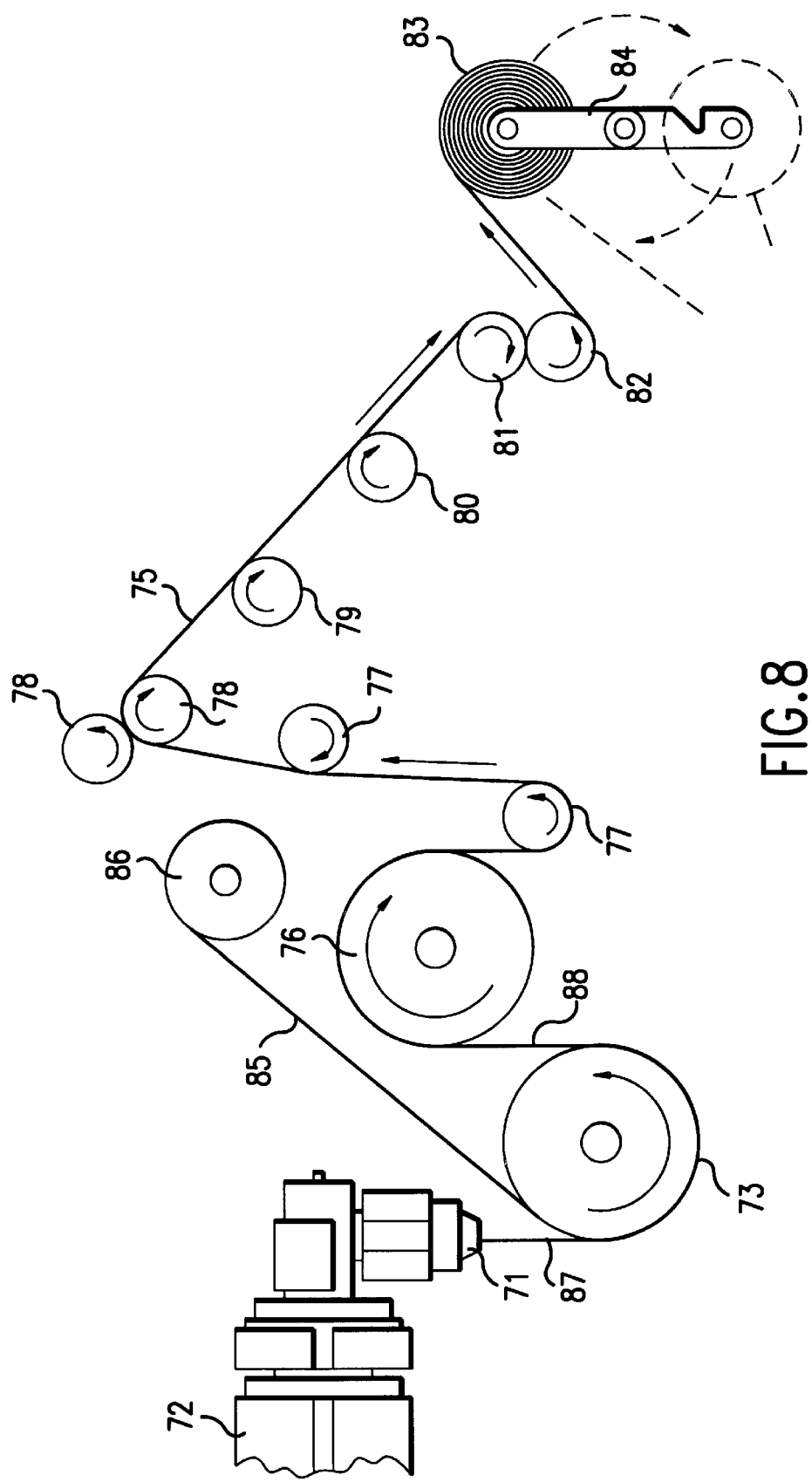
FIG. 8 illustrates a schematic view of an alternative preferred process for making preferred multilayer films as illustrated in FIGS. 4 and 5.

FIG. 8 illustrates a substrate/coating process for preparation of multilayer films, which can be, for example, the films illustrated in FIGS. 5 and 6. In FIG. 8, substrate film 85, supplied from roll 86, is directed onto chill roll 73 and coated with molten coating 87 passing vertically downward from slot die 71 towards chill roll 73. Coating 87 is cooled by chill roll 74, the heat from coating 87 passing through substrate film 85 and into chill roll 73, to result in coated substrate 88. Furthermore, if additional downstream chill rolls are present, such as chill roll 76, further cooling can be effected by direct contact of coating 87 with the smooth surface of the chill roll, i.e., without substrate film 85 between coating 87 and the chill roll. Subsequent downstream processing of coated substrate 88 is the same as described in FIG. 7.

Preferably, the films of FIGS. 5 and 6 are prepared according to the process described in U.S. Pat. No. 4,287,151, to ESAKOV, et. al., which is hereby incorporated in its entirety, by reference thereto.

The films illustrated in FIGS. 5 and 6, and described in detail above, are preferably used in a packaging process employing a thermoforming step. Both a forming web and a non-forming web can be fed from two separate rolls, with the forming web being fed from a roll mounted on the bed of the machine for forming the package "pocket," i.e., the product cavity. The non-forming (lidstock) web is usually fed from a top-mounted arbor for completing the airtight top seal of the package. Each web has its meat-contact/sealant surface oriented towards the other, so that at the time of sealing, the sealant surfaces face one another. The forming web is indexed forward by transport chains, and the previously sealed package pulls the upper non-forming web along with the bottom web as the machine indexes.

The first step in the packaging process is the formation of the product cavity in the forming web. The cavity forming is a three-step process: index—heat—form. While one cavity is being formed, the web for the next cavity is undergoing preheating before being indexed over the pocket-forming die. To accomplish this, the forming web is heated from 70° C. to 80° C. by being pressed against a contact-type heater by means of vacuum. The forming web is then formed by use of compressed air or vacuum, or both. Compressed air pushes the heated film into the die cavity from above and, in turn, vacuum pressure pulls the film into shape from within the die. A plug is used to assist the movement of the heated film into the die cavity.

After forming, the transport chains carry the empty pocket to the loading station where the product is either hand loaded or pumped into the cavity. The transport chains then carry the loaded product to the vacuum and sealing station.

The sealing process is a series of operations occurring simultaneously or with a slight overlap. Once the top film is in place over the filled cavity, the sealing chamber closes. Package air is exhausted between the top and bottom films. The upper chamber, or lid, employs a heated seal plate set at from 150° C. to 170° C., which bonds the non-forming web and the forming web together.

The vacuum in the seal die balances chamber pressures, and ensures that no air is trapped between the product and the forming web. The sealing diaphragms, empty of air, are now filled with compressed air. This presses the heated sealing plate against the upper film, compressing the heat-sealable surfaces of the two webs between the sealing plate and the T-rubber sealing gasket. The heat and pressure of the sealing plate causes the two surfaces of the films to bond together, sealing the product in a vacuum environment. Approximately 0.4 to 0.5 seconds after sealing ends, the upper and lower chambers are vented to the atmosphere, causing the top and bottom films to collapse around the product. Now, the sealing diaphragms evacuate and the sealing plate moves back up. Outside air rushes into the chambers. When the air pressures are equalized, the die bottom can move down, allowing the package to be indexed out of the seal station.

The sealed package is then separated from the web by way of a contour knife system. The packages are conveyed through a hot water (205° F.) shrink tunnel. The packages are placed on racks and cooked in a high humidity oven. The product is then chilled and available for shipping or for further processing, which may involve stripping the package off of the product.

Examples 3 and 4, below, provide additional details on the films of FIGS. 5 and 6, their use in the packaging of a meat product, and the unexpected results obtained from the use of the film in the packaging and cook-in of the meat product, i.e., the low level of purge in combination with the low level of meat pull-off after the cook-in process is complete.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

Although the multilayer film of the present invention is preferably not irradiated, optionally the film may be irradiated. In the irradiation process, the film is subjected the film to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

Radiation dosages are referred to herein in terms of the radiation unit "RAD", with one million RADS, also known as a megarad, being designated as "MR". A suitable radiation dosage of high energy electrons is in the range of up to about 12 MR, more preferably about 2 to about 9 MR, and still more preferably, about 3 MR. Preferably, irradiation is carried out by an electron accelerator and the dosage level is determined by standard dosimetry methods.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface.

Corona treatment of polymeric materials is disclosed in U.S. Pat. No. 4,120,716, to Bonet, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to Hoffman, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

Although corona treatment is a preferred treatment of the multilayer film of the present invention, plasma treatment of the film may also be used.

Although in general the product in the package can be any cooked meat product, preferably the cooked meat product comprises at least one member selected from the group consisting of poultry pork, beef, lamb, goat, horse, and fish; more preferably, poultry, pork, beef, and fish.

Figure 9:
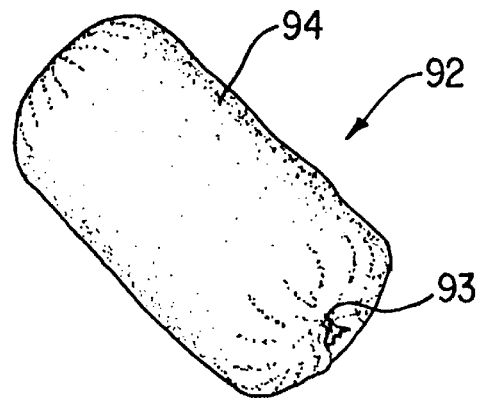
FIG. 9 illustrates a perspective view of a packaged product according to the present invention.

FIG. 9 illustrates one embodiment of a packaged product 92 of the present invention, the product being packaged in a casing closed by a pair of clips 93 at each end thereof, with only one being illustrated in FIG. 9. Film 94, used to package the meat product therewithin, can be, for example, multilayer film 13 illustrated in FIG. 2, or multilayer film 21 illustrated in FIG. 3, both of which are discussed in detail above. In FIG. 9, the cooked meat product preferably comprises pork, in the form of sausage.

Figure 10:
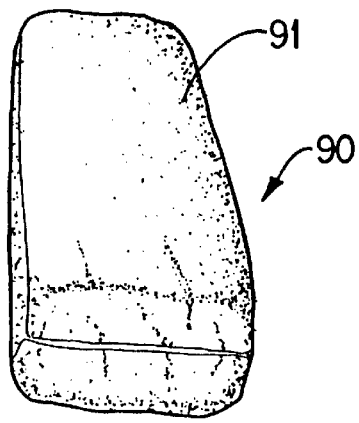
FIG. 10 illustrates a perspective view of an alternative packaged product according to the present invention.

FIG. 10 illustrates another embodiment of a packaged cooked meat product 90, according to the present invention. The product, a cooked meat product, is packaged in a heat-sealed, heat-shrinkable bag, within which the meat product has been cooked. The package comprises multilayer film 91, which can be, for example, multilayer film 13 illustrated in FIG. 2, or multilayer film 21 illustrated in FIG. 3, both of which are discussed in detail above. In FIG. 10, the cooked meat product comprises pork, in the form of a boneless ham.

Figure 11:
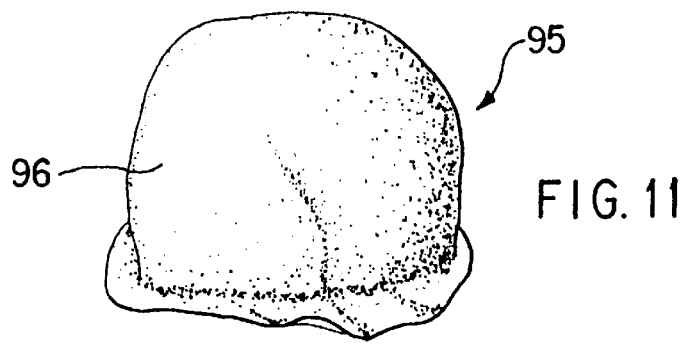
FIG. 11 illustrates a perspective view of another alternative packaged product according to the present invention.

FIG. 11 illustrates yet another embodiment of a packaged cooked meat product 95, according to the present invention. The product, a cooked meat product, is packaged in a heat-sealed, thermoformed web having a lidstock web sealed thereto, with the meat product being cooked within the sealed thermoformed package. The package comprises multilayer film 96, which can be, for example, multilayer film 50 illustrated in FIG. 5, or multilayer film 60 illustrated in FIG. 6, both of which are discussed in detail above. In FIG. 11, the cooked meat product comprises poultry, more specifically, a boneless turkey breast product, as described below between Example 3 and Example 4.

The invention is illustrated by the following examples, which are provided for the purpose of representation, and are not to be construed as limiting the scope of the invention. Unless stated otherwise, all percentages, parts, etc. are by weight.

EXAMPLE 1

A six-layer film was produced according to a method as set forth in the process schematic illustrated in FIG. 4. A 3⅜ inch wide (lay flat dimension) tube, called a "tape", was produced by the coextrusion process described above wherein the tape cross-section was as follows:

TABLE I

| layer order | layer name | layer function | chemical identity | thickness (mils) |
|---|---|---|---|---|
| 1 | first | meat-contact & heat seal | anhydride-containing LLDPE #1 | 3.6 |
| 2 | fifth | core | blend of 80% EVA #1 & 20% LLDPE #2 | 5.6 |
| 3 | sixth | tie | anhydride-grafted LLDPE #3 | 1.1 |
| 4 | third | core (barrier) | EVOH #1 | 1.2 |
| 5 | fourth | tie | anhydride-grafted LLDPE #3 | 1.1 |
| 6 | second | outer (abuse) | blend of 90% EVA #2 and 10% HDPE #1 | 4.5 |

In Table I, the numerals indicating the "layer order" correspond with the position of the layers relative to one another, with layer 1 being the inside layer of the tube, and layer 6 being the outside layer of the tube. Layer 2 is in direct contact with layers 1 and 3, layer 3 in direct contact with layers 2 and 4, and so on. In contrast, the "layer name" designates the various layers as "first", "second", etc., these layer names corresponding with the detailed description of the respective Figures, as discussed above, and the names of the layers recited in the claims, as set forth below.

The various resins in the layers were as follows: anhydride-containing LLDPE #1 is PLEXAR (TM) 360 anhydride containing linear low density polyethylene, obtained from Quantum Chemical Company of Cincinnati, Ohio; LLDPE #2 is DOWLEX (TM) 2045.03 linear low density polyethylene, obtained from Dow Plastics, of Freeport, Tex.; anhydride-grafted LLDPE #3 is TYMOR (TM) 1203 linear low density polyethylene having an anhydride functionality grafted thereon, obtained from Morton International, of Chicago, Ill.; EVA #1 is ELVAX (TM) 3128 ethylene vinyl acetate copolymer, obtained from E.I. DuPont de Nemours, of Wilmington, Del.; EVA #2 is PE 5269T (TM) ethylene vinyl acetate copolymer, obtained from Chevron Chemical Company of Houston, Tex.; EVOH #1 is LC-E105A polymerized ethylene vinyl alcohol, obtained from Eval Company of America, of Lisle, Ill.; and, HDPE #1 is FORTIFLEX (TM) J60-800C-147 high density polyethylene, obtained from Solvay & Cie S.A., of Houston, Tex.

All the resins were extruded between 380° F. and 430° F., and the die was at approximately 395° F. The extruded tape was cooled with water and flattened, the flattened width being 3-⅜ inches wide, in a lay-flat configuration. The tape was then passed through a scanned beam of a 500 kV electronic cross-linking unit, where it received a total dosage of 70.7 kilo Grays (kGy), which is the equivalent of 5 mega Rads (MR). After irradiation, the flattened tape was passed through hot water at 204° F. to 210° F., inflated into a bubble, and oriented into tubing having a layflat width of 10 inches and a total thickness of 2.3 mils. The bubble was extremely stable and the optics and appearance of the film were good. The resulting film had 22% free shrinkage in the longitudinal direction and 32% free shrinkage in the transverse direction when immersed in hot water at 185° F. (using ASTM method D2732-83).

Bags were made from the oriented tubing by making a transverse heat seal across the width of the tubing and then severing the tubing parallel to and immediately behind the seal. A water-added ham product was stuffed into the bags, following which air was withdrawn from the package and the bags were sealed with a metal clip to give packages approximately 5 pounds in weight. These packages, containing the ham product, were then step-cooked in a high humidity environment from 140° F. to 170° F., over a 4 hour period. After cooking, the packages were removed from the cook-tank and chilled for 16 hours at 32° F. The chilled packages were then examined for purge and found to have no free moisture between the cooked meat product and the plastic material. Furthermore, although the packaging film prevented purge, it stripped freely from the meat, i.e., pulling off much less meat, by a factor of at least 2, than packaging films comprising a meat-contact layer containing ionomer.

EXAMPLE 2

An eight-layer film was produced, again according to a method as set forth in the process schematic illustrated in FIG. 4. A 5 inch wide (lay flat dimension) tape was produced by the coextrusion process described above wherein the tape cross-section was as follows:

TABLE II

| layer order | layer name | layer function | chemical identity | thickness (mils) |
|---|---|---|---|---|
| 1 | first | meat-contact & heat seal | anhydride-containing LLDPE #1 | 3.2 |
| 2 | sixth | core | blend of 80% EVA #1 & 20% LLDPE #2 | 4.6 |
| 3 | seventh | tie | anhydride-grafted LLDPE #3 | 1.0 |
| 4 | eighth | core | blend of 50 wt. % polyamide 66/610 copolymer and 50 wt. % polyamide 6/12 copolymer | 2.8 |
| 5 | third | core (barrier) | EVOH #1 | 1.1 |
| 6 | fourth | tie | anhydride-grafted LLDPE #3 | 1.9 |
| 7 | fifth | core | blend of 80% EVA #1 and 20% LLDPE #2 | 3.2 |
| 8 | second | outer (abuse) | LLDPE #4 | 3.1 |

As in Table I, the numerals in Table II indicating the "layer order" correspond with the position of the layers relative to one another, with layer 1 being the inside layer of the tube, and layer 8 being the outside layer of the tube. Layer 2 is in direct contact with layers 1 and 3, layer 3 in direct contact with layers 2 and 4, and so on. In contrast, the "layer name" designates the various layers as "first", "second", etc., these layer names corresponding with the detailed description of the respective Figures, as discussed above, and the names of the layers recited in the claims, as set forth below.

The various resins identified in Table III above are identical to the like-designated resins identified in and after Table I, above. The additional resins identified in Table II are as follows:

"nylon 66/610 copolymer" is XE 3303 (TM) polyamide copolymer, obtained from EMS-American Grilon Inc. of Sumter, S.C.;

"nylon 6/12 copolymer" is CF6S (TM) polyamide, obtained from EMS-American Grilon Inc., of Sumter, S.C.;

"LLDPE #4" is DOWLEX (TM) 2244A linear low density polyethylene, obtained from Dow Plastics of Freeport, Tex.

As in Example 1, all the resins were extruded between 380° F. and 430° F. However, the die was at a temperature of approximately 420° F. The extruded tape was cooled with water and flattened, the lay-flat width being 5 inches. The tape was then passed through the scanned beam of a 500 kV electronic cross-linking unit, where it received a total dosage of 68.3 kilo Grays (kGy), which is the equivalent of 4.5 mega Rads (MR). After irradiation, the flattened tape was passed through hot water at 204° F. to 210° F., inflated into a bubble, and oriented into tubing having a layflat width of 15 inches and a total thickness of 2.3 mils. The bubble was extremely stable and the optics and appearance of the film were good. The resulting film had 19% free shrinkage in the longitudinal direction and 29% free shrinkage in the transverse direction when immersed in hot water at 185° F. (using ASTM method D2732-83).

The tubing, made as described immediately above, was then slit into film. The film was folded longitudinally about a forming shoe with opposed edges being joined by applying a heat seal longitudinally over the overlap, to form a lap seal. This tubing, termed a "backseamed tubing," was then clipped at one end and filled with turkey emulsion from the open end, to result in a chub weighing approximately 5 pounds. The tubing was then closed with a metal clip and cooked for 4 hours at 170° F. and under high humidity. The cooked casings were then cooled in a cooler kept at 32° F. for 16 hours. These chilled casings were then examined for purge and found to have no free moisture between the product and the plastic material. Furthermore, as in Example 1, although the packaging film of Example 2 prevented purge, it stripped freely from the meat, i.e., pulling off much less meat, by a factor of at least 2, than packaging films comprising a meat-contact layer containing ionomer.

EXAMPLE 3

A seven-layer film is produced by the cast film process shown in FIG. 7. Six conventional single screw extruders are employed to melt and pump the various resin through the injection block or manifold slot die system. The EVA-containing and EVOH-containing layers are extruded at a temperature of from about 350° F. to 450° F., and the LLDPE-containing layers extruded at a temperature of from about 400° F. to 500°F. The nylon-containing layers are extruded at 450° F. to 550° F. The melt system and die are designed with flow channels to produce uniform distribution across the width of the die for all 7 layers.

Upon extrusion, the molten 7-layer web drops onto a water cooled chill roll having a temperature controlled to 40° F. to 60° F., which quickly brings the molten web to room temperature, or below room temperature, so that crystallization is minimized. This roll has internal spirally wound channels that direct the water flow beneath the outer shell to provide good heat transfer characteristics. The web is "pinned" to the chill roll with an air knife or electrostatic pinning device commonly used in cast film production.

The completed cast web is then wound into a roll and later resized to a width suitable for a horizontal packaging machine, such as a Multivac thermoforming packaging machine. The roll of film is used as the forming web in the thermoforming packaging machine. The construction of the seven-layer film structure is as follows:

TABLE III

| layer order | layer name | layer function | chemical identity | thickness (mils) |
| --- | --- | --- | --- | --- |
| 1 | first | meat-contact & heat seal | anhydride-containing LLDPE #1 | 2.3 |
| 2 | fifth | tie | modified, anhydride-grafted LLDPE #5 | 0.65 |
| 3 | fourth | abuse & thermoforming | nylon 6 #1 | 0.6 |
| 4 | third | oxygen barrier | EVOH #2 | 0.9 |
| 5 | second | abuse & thermoforming | nylon 6 #1 | 0.6 |
| 6 | sixth | tie & bulk | anhydride-grafted ethylene vinyl acetate copolymer #1 | 1.85 |
| 7 | seventh | abuse, heat resistance, & thermoforming | nylon 6 #2 | 3.2 |

As in Table II, the numerals in Table III indicating the "layer order" correspond with the position of the layers relative to one another, with layer 1 being the inside layer relative to the packaged product, and layer 7 being the outside layer relative to the packaged product. Layer 2 is in direct contact with layers 1 and 3, layer 3 in direct contact with layers 2 and 4, and so on. In contrast, the "layer name" designates the various layers as "first", "second", etc., these layer names corresponding with the detailed description of the respective Figures, as discussed above, and the names of the layers recited in the claims, as set forth below.

The various resins identified in Table III above are identical to the like-designated resins identified in and after Tables I and II, above. The additional resins identified in Table III are as follows:

"modified, anhydride-grafted LLDPE #5" is TYMOR 1203 anhydride modified grafted linear low density polyethylene, obtained from Morton International Specialty Chemical Company, of Chicago, Ill.;

"anhydride-modified grafted LLDPE #6" is TYMOR 1208 anhydride-modified grafted linear low density polyethylene, obtained from Morton International Specialty Chemical Company, of Chicago, Ill.;

"nylon 6 #1" is ULTRAMID (TM) XR 4418, obtained from BASF Corporation of Charlotte, N.C.;

"nylon 6 #2" is ULTRAMID (TM) KR 4407 polyamide, obtained from BASF Corporation of Charlotte, N.C.;

"EVOH #2" is SOARNOL (TM) E/T polymerized ethylene vinyl alcohol, produced by Nippon Gohsei, and obtained from Morton International Specialty Chemical Company; and "anhydride-grafted ethylene vinyl acetate copolymer #1" is BYNEL (TM) 3095 ethylene vinyl acetate copolymer, obtained from E.I. DuPont de Nemours, of Wilmington, Del.

A film produced as above, except having half the total thickness, and the same thickness of each layer relative to the remaining layers, is prepared by an analogous process, and is used as the non-forming web (i.e., lidstock) in the thermoforming packaging machine described above.

COMPARATIVE RESULTS

Four seven-layer films are used to package a boneless, skinless turkey breast product. The forming web is placed on the back unwind of a Tiromat thermoform packaging machine, and is then indexed to the pre-heat and forming station. The turkey breasts are hand loaded into the formed cavity on the Tiromat. Since the turkey product contains a minimal amount of extractable additives and tumbling, purge levels are traditionally high. The raw product in the formed cavity is then indexed to the sealing head where it is vacuumized, and the non-forming web is sealed to the forming web. The sealed package is then cut loose from the web with a contour knife system. The packages are conveyed through a hot water (205° F.) shrink tunnel. The packages are placed on racks and cooked in a high humidity oven. The product is then chilled and available for shipping or for further processing.

The packaged turkey breast product is evaluated for seal integrity and adhesion. Yield data is determined for ten samples for each of the films used. These results are presented in Table IV, below. The primary and secondary seals are intact for all four films tested.

TABLE IV

| film identity | anhydride functionality | corona treatment | amorphous nylon | percent yield |
|---|---|---|---|---|
| A | no | no | no | 92.7 |
| B | no | yes | no | 96 |
| C | yes | no | yes | 96 |
| D | yes | yes | yes | 96.5 |

Film A is characterized as having relatively high purge with no meat pull-off. Film B is characterized as having lower purge than film A, but at the expense of meat pull-off. Film C is characterized as having purge similar to Film B, but with minimal meat pull-off. Film D is characterized as having purge similar to #2, also with minimal meat pull-off.

The results provided in Table IV indicate that the use of corona treatment and/or anhydride (i.e., films B, C, and D) provides a yield substantially greater than the yield produced without at least one of these features in the film (i.e., film A). Furthermore, films having the anhydride functionality on the inside layer do not require dust or other antiblocking agents and slip agents, or corona treatment, which produces undesirable unwind characteristics. Film "C" is the film of Example 3.

EXAMPLE 4

A nine-layer film is produced by the cast film process shown in FIG. 7. Eight conventional single screw extruders are employed to melt and pump the various resins through the injection block or manifold die system. The EVA-layer is extruded at room temperature between 350° F. and 450° F.; the LLDPE-containing layers at 400° F. to 500° F. The polyamide-containing layers are extruded at 400° F. to 500° F. The melt system and die are designed with flow channels to produce uniform distribution across the width of the die of all 9 layers.

A slot die extrudes the nine-layer coextruded film. The molten web drops onto a water cooled chill roll having a temperature controlled to 40° F. to 60° F., which quickly brings the molten web to room temperature, or below room temperature, so that crystallization is minimized. This roll has internal spirally-wound channels that direct the water flow beneath the outer shell to provide good heat transfer characteristics. The web is "pinned" to the chill roll with an air knife or an electrostatic pinning device, as known to those of skill in the art of cast film production.

The completed cast web is then wound into a roll and later resized to a width and diameter suitable for a horizontal packaging machine, such as a Multivac thermoforming packaging machine. The roll of film is used as the forming web in the thermoforming packaging machine. The construction of the nine-layer film structure is as follows:

TABLE V

| layer order | layer name | layer function | chemical identity | thickness (mils) |
|---|---|---|---|---|
| 1 | first | meat-contact & heat seal | anhydride-containing LLDPE #1 | 0.3 |
| 2 | ninth | heat sealing, bulk & abuse | LLDPE #4 | 2.04 |
| 3 | fifth | tie | anhydride-modified grafted LLDPE #5 | 0.36 |
| 4 | fourth | thermoforming & abuse | blend of 75% nylon 6 #3 & 25% amorphous nylon | 0.45 |
| 5 | third | tie & bulk | anhydride-modified grafted LLDPE #6 | 0.9 |
| 6 | second | thermforming & abuse | blend of 75% nylon 6 #3 & 25% amorphous nylon | 0.45 |
| 7 | sixth | tie | anhydride-grafted ethylene vinyl acetate copolymer (EVA #1) | 0.6 |
| 8 | eighth | thermoforming & abuse | blend of 75% nylon 6 #3 & 25% amorphous nylon | 0.6 |
| 9 | seventh | heat-resistance & abuse | nylon 6 #1 | 0.3 |

In Table V, as in Table III, the numerals indicating the "layer order" correspond with the position of the layers relative to one another, with layer #1 being the inside layer of the tube, and layer #9 being the outside layer of the tube. Layer 2 is in direct contact with layers 1 and 3, layer 3 in direct contact with layers 2 and 4, and so on. In contrast, the "layer number" designation in Table V corresponds with the "first layer" being designated "1", the "second layer" being designated "2", and so on, these names of the layers corresponding with the detailed description of the applicable Figure, as discussed above, and the names of the layers recited in the claims, as set forth below.

In the nine-layer film, any resin identified in a manner identical to a resin used in the seven-layer film used in Examples 1–3, was identical to those resins, and was obtained from the same source as identified in those examples. The following additional resins were used in the nine-layer film of Example 4:

"amorphous nylon" is GRIVORY (TM) G21 amorphous nylon, obtained from EMS-American Grilon Inc., of Sumter, S.C.;

"nylon 6 #3" is ULTRAMID (TM) B35 polyamide 6, obtained from BASF Corporation of Charlotte, N.C.; and "modified, anhydride-grafted LLDPE #6" is TYMOR 1208 anhydride modified grafted linear low density polyethylene, obtained from Morton International Specialty Chemical Company, of Chicago, Ill.

A film produced as above, except having half the total thickness and the same thickness of each layer relative to the remaining layers, is prepared by an analogous process, and is used as the non-forming web (i.e., lidstock) in the thermoforming packaging machine described above.

It is believed that the nine-layer film of Example 4 will perform in a manner similar to, or better than, the seven-layer film described in Example 3.

EXAMPLE 5

A mono-layer film is produced by the cast film process in a manner as illustrated in FIG. 8. A single extruder and mono-ply die are used to extrude a single film layer, which is thereafter extrusion coated with a three-layer heat sealable coating, to result in a four-layer film. The nylon-6 layer is extruded at 450° F. to 550° F., and cast on a chill roll at 40° F. to 60° F. The film is then extrusion coated with a three-layer heat sealable coating, using three conventional single-screw extruders, through a three-layer manifold die, extruded at a temperature of 450° F. to 600° F. The three-layer construction drops onto the previously produced nylon film while the nylon film is on the surface of a chill roll having a surface temperature of 40° F. to 60° F.

The completed cast web is then wound into a roll and later resized to a width and diameter suitable for a horizontal packaging machine, such as a Multivac thermoforming packaging machine. The roll of film is used as the forming web in the thermoforming packaging machine. The construction of the four-layer film structure is as follows:

TABLE V

| layer number | layer function | chemical identity | thickness (mils) |
|---|---|---|---|
| 1 | heat-sealing, thermoforming, & abuse-resistant | nylon-6 #3 | 5 |
| 2 | tie | anhydride grafted ethylene vinyl acetate copolymer #3 | 0.5 |
| 3 | bulk, heat-sealable | LLDPE #7 | 2.0 |
| 4 | meat-contact | anhydride-containing LLDPE #1 | 0.5 |

In the four-layer film, any resin identified in a manner identical to a resin used in the films described in Examples 1–4 is identical to those resins, and is obtained from the same source as identified in those examples. The following additional resins were used in the four-layer film of Example 5:

"anhydride-grafted ethylene vinyl acetate copolymer #3" is BYNEL (TM) 4015 anhydride grafted ethylene vinyl acetate copolymer, obtained from E.I. DuPont de Nemours, of Wilmington, Del.; and "LLDPE #7" is Dowlex (TM) 3010 linear low density polyethylene, obtained from the Dow Chemical Company of Midland, Mich.

Although the present invention has been described with reference to particular means, materials, and embodiments, it should be noted that the invention is not to be limited to the particulars disclosed, and extends to all equivalents within the scope of the claims.

What is claimed is:

1. A multilayer film comprising a first layer which is an outer sealant layer and a second layer which is a core layer which is directly adhered to the seal layer, and a third layer which is a second outer layer, wherein the first layer has a thickness less than 100% of the thickness of the second layer, and the second layer has a Vicat softening point less than 5° C. higher than the Vicat softening point of the outer sealant layer, wherein the outer sealant layer comprises an anhydride functionality, and upon carrying out a Condition A extraction, the anhydride is extractable from the film to a level of less than 50 parts per billion.

2. The multilayer film according to claim 1, wherein the first layer has a thickness of less than 50% of the thickness of the second layer.

3. The multilayer film according to claim 2, wherein the first layer has a thickness of less than 25% of the thickness of the second layer.

4. The multilayer film according to claim 3, wherein the second layer comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer.

5. The multilayer film according to claim 4, wherein the first layer comprises polyolefin and the second layer comprises polyolefin.

6. The multilayer film according to claim 5, wherein the film has a machine direction free shrink of at least 10 percent at a temperature of 185° F. for 8 seconds, and a transverse direction free shrink of at least about 10 percent at a temperature of 185° F. for 8 seconds.

7. The multilayer film according to claim 5, wherein the film further comprises a tie fourth layer, between the second layer and the third layer, the fourth layer comprising at least one member selected from the group consisting of modified polyolefin, ionomer, ethylene acrylate copolymer, ethylene acrylic acid, polyamide, and polyurethane.

8. The multilayer film according to claim 7, wherein the film further comprises:

a fifth layer, between the first layer and the third layer, comprising at least one member selected from the group consisting of polyolefin, polyamide, polyester, and polyurethane, and a tie sixth layer, between the third layer and the fifth layer, comprising at least one member selected from the group consisting of modified polyolefin, ionomer, ethylene acrylate copolymer, ethylene acrylic acid, polyamide, and polyurethane.

9. The multilayer film according to claim 7, wherein the film further comprises:

a fifth layer, between the second layer and the fourth layer, comprising at least one member selected from the group consisting of polyolefin, polyamide, polyester, and polyurethane, a sixth layer, between the first layer and the third layer, comprising at least one member selected from the group consisting of polyolefin, polyamide, polyester, and polyurethane; and a tie seventh layer, between the third layer and the sixth layer, comprising at least one member selected from the group consisting of modified polyolefin, ionomer, ethylene acrylate copolymer, ethylene acrylic acid, polyamide, and polyurethane.

10. The multilayer film according to claim 9, wherein the film further comprises an eighth layer, between the third layer and the seventh layer, the eighth layer comprising at least one member selected from the group consisting of polyamide and thermoplastic elastomer.

11. The multilayer film according to claim 4, wherein:

the second layer comprises a polyamide and the third layer comprises at least one member selected from the group consisting of ethylene vinyl alcohol copolymer and ethylene alpha-olefin copolymer, and wherein the film further comprises:

a fourth layer, between the first layer and the third layer, comprising at least one member selected from the group consisting of polyolefin, polystyrene, polyamide, polyester, polymerized ethylene vinyl alcohol, polyvinylidene chloride, polyether, polyurethane, polycarbonate, and starch-containing polymer;

a tie fifth layer, between the first layer and the fourth layer, comprising at least one member selected from the group consisting of anhydride-grafted polyolefin;

a tie sixth layer, between the second layer and a seventh layer, comprising at least one member selected from the group consisting of anhydride-grafted polyolefin;

a seventh layer, between the sixth layer and the third layer, comprising a polyamide; and an eighth layer, between the first layer and the fifth layer, comprising at least one member selected from the group consisting of ethylene alpha-olefin copolymer, propylene copolymer, ethylene vinyl acetate copolymer, ethylene acrylate copolymer, and ethylene acrylic acid copolymer.

12. A multilayer film comprising a first layer which is an outer sealant layer and a second layer which is a core layer which is directly adhered to the outer sealant layer, and a third layer which is a second outer layer, wherein the first layer has a thickness less than 100% of the thickness of the second layer, and the second layer has a melt initiation temperature less than 5° C. higher than the melt initiation temperature of the first layer, and wherein the first layer comprises an anhydride functionality, and upon carrying out a Condition A extraction, the anhydride is extractable from the film to a level of less than 50 parts per billion.

13. The multilayer film according to claim 12, wherein the first layer has a thickness of less than 50% of the thickness of the second layer.

14. The multilayer film according to claim 13, wherein the first layer has a thickness of less than 25% of the thickness of the second layer.

15. The multilayer film according to claim 14, wherein the second layer comprises at least one member selected from the group consisting of polyolefin, polystyrene, polyamide, polyester, polymerized ethylene vinyl alcohol, polyvinylidene chloride, polyether, polyurethane, polycarbonate, and starch-containing polymer.

16. A multilayer film comprising a first layer which is an outer sealing layer, a second layer which is a core layer which is directly adhered to the first layer, and a third layer which is an outer heat-resistant layer, the third layer having a Vicat softening point of at least 5° C. greater than the Vicat softening point of the first layer, and greater than the Vicat softening point of the second layer, the second layer comprising a blend of amorphous nylon and at least one member selected from the group consisting of polyamide 6, polyamide 11, polyamide 12, polyamide 66, polyamide 610, polyamide 612, polyamide 6/12 copolymer, polyamide 6/66 copolymer, and polyamide 66/610 copolymer, and wherein the first layer comprises an anhydride functionality, and upon carrying out a Condition A extraction, the anhydride is extractable from the film to a level of less than 50 parts per billion.

17. The multilayer film according to claim 16, wherein the amorphous nylon is present in the blend in an amount of least 5 weight percent, based on the weight of the second layer.

18. The multilayer film according to claim 17, wherein the amorphous nylon is present in the blend in an amount of at least 20 weight percent.

19. The multilayer film according to claim 18, wherein the amorphous nylon is present in the blend in an amount of from about 20 to 70 weight percent.

20. The multilayer film according to claim 19, wherein the amorphous nylon is present in the blend in an amount of about 25 weight percent, and the second layer comprises polyamide 6, and the first layer has a thickness of about 5% of the total film thickness.

\* \* \* \* \*